(12) United States Patent
Engelhardt et al.

(10) Patent No.: US 6,423,960 B1
(45) Date of Patent: Jul. 23, 2002

(54) METHOD AND SYSTEM FOR PROCESSING SCAN-DATA FROM A CONFOCAL MICROSCOPE

(75) Inventors: Johann Engelhardt, Bad Schonborn; Bernd Widzgowski, Dossenheim, both of (DE)

(73) Assignee: Leica Microsystems Heidelberg GmbH, Heidelberg (DE)

( * ) Notice: Subject to any disclaimer, the term of this patent is extended or adjusted under 35 U.S.C. 154(b) by 0 days.

(21) Appl. No.: 09/476,589

(22) Filed: Dec. 31, 1999

(51) Int. Cl.[7] ................................................ H01J 40/14
(52) U.S. Cl. .................... 250/214 R; 250/234; 356/622
(58) Field of Search ............................ 250/214 R, 234, 250/235, 236, 216, 559.38, 214 DC, 214 L; 356/622; 341/155

(56) References Cited

U.S. PATENT DOCUMENTS

| | | | | |
|---|---|---|---|---|
| 5,283,433 A | * | 2/1994 | Tsien | 250/234 |
| 5,589,936 A | * | 12/1996 | Uchikawa et al. | 356/345 |
| 5,804,813 A | | 9/1998 | Wang et al. | 250/201.3 |
| 6,248,988 B1 | * | 6/2001 | Krantz | 250/201.3 |
| 6,303,916 B1 | * | 10/2001 | Gladnick | 250/205 |

* cited by examiner

Primary Examiner—Kevin Pyo
Assistant Examiner—Seung C. Sohn
(74) Attorney, Agent, or Firm—Maria M. Eliseeva, Esq.; Brown Rudnick Berlack Israels, LLP

(57) ABSTRACT

The invention discloses a method and system for processing scan signals from a confocal microscope. The confocal microscope comprises an illumination source and a scanning device with a scanning mirror system. A control and processing unit is provided, which unit uses a plurality of programmable devices for the real time processing of digital signals. The control and processing unit has at least three input ports and one output port. A first detector generates analog signals corresponding to the light reflected from a specimen within the microscope and a second detector generates analog signals corresponding to the intensity of the light from the illumination source. In addition, a position signal of the scanning laser beam is provided to the control and processing unit. Analog-to-digital converters receive the analog signals, generate digital signals and provide the digital signals to the input ports of the control and processing unit.

24 Claims, 4 Drawing Sheets

METHOD AND SYSTEM FOR PROCESSING SCAN-DATA FROM A CONFOCAL MICROSCOPE

FIELD OF THE INVENTION

The present invention relates to a method and system for processing scan-data from a confocal microscope. More specifically, the invention relates to a method and system enabling real-time processing of the scanned data.

BACKGROUND OF THE INVENTION

In confocal microscopy a specimen is scanned with a focused laser beam. The focus of the laser beam is moved in a section plane of a specimen by two scan mirrors tilting around their respective axes, which axes are perpendicular to each other. The first scan mirror diverts the laser light in the x-direction and the second scan mirror diverts the laser light in the y-direction while the intensity of the reflected or the fluorescent light is measured for each scanning point. Each measured intensity value relates to an x, y and z-position of the specimen, therefore, providing a user with a three-dimensional image of the specimen.

An example for a confocal microscope is disclosed in U.S. Pat. No. 5,804,813 "Differential confocal microscopy" to J. P. Wang et al. That Patent describes a He—Ne laser as the light source, and a microscope objective lens as a focusing device. The light signal reflected from the surface of a specimen travels through a beam splitter and is almost completely reflected at the surface to travel to an optical detector which can use photodiodes, avalanche photodiodes, photo multipliers, charge coupled devices (CCDs), or fluorescent screens. The signal is detected by the optical detector and then amplified by a signal amplifier. The amplified signal is recorded by an analog-to-digital converter and then stored in a computer. The computer generates a three-dimensional image by using the intensity of the signal corresponding to the respective coordinates of the specimen. Before the measurement is performed, it is necessary to use the same sample to calibrate the relationship between the variation of signal intensity and the height of the sample.

The ideal scan pattern of the light beam on the surface of a specimen is a meander pattern. Such a scan pattern is usually generated by scanning one line in the x-direction (a "+"x-direction) with a constant y-position, then stopping the scan in the x-direction and moving the y-position of the beam to the next scan line, then scanning this new line in the opposite x-direction (a "−" x-direction) and so on. In reality, however, the meander scan pattern does not exist for high scan rates due to the inertia of the galvanometric devices and scanning mirrors. The real path of the scanning beam at scan rates higher than 100 Hz is a sinusoidal curve which requires a correction to the ideal path. Several types of errors may occur during scanning due to, for example, a higher velocity of scanning at a turning point of the real path or due to a different shape of the scan path for different scan directions. In addition, different run and process times for the intensity and position signals have to be considered.

Registration and processing of a position signal is normally done with analog circuit, computers or digital signal processors (DSP). There are certain disadvantages of signal processing with analog circuits. For example, signal processing can only be carried out with the help of a correction function implemented in an analog circuit. Changes of the correction mechanism, such as for example, changes of a scan rate, require a lot of effort. Moreover, the accuracy of analog circuits with respect to mathematical operations reaches its limit at high scan rates. Pixel rates greater than 1 MHz at a 12-bit accuracy can be achieved only with enormous effort.

Signal processing with a computer or DSP is possible at low scan rates. However, while signal processing is flexible because of the ease with which the algorithms used in such processing can be changed or modified, at higher scan rates computers or DSPs fail due to their inability to perform data processing in real time.

SUMMARY OF THE INVENTION

It is, therefore, an object of the present invention to provide a system for real time processing of digital scan-signals from a confocal microscope, in which system the accuracy of the measurements depends solely on the accuracy of detectors and analog-to-digital converters. Furthermore, the processing of the scan-signals becomes possible at high scanning rates. This object of the invention is accomplished by a system having at least three different analog signals generated by a confocal microscope, at least three analog-to-digital converters each receiving a different analog signal and producing a digital signal at an early stage of processing, and a control and processing unit which uses a plurality of programmable devices to process the digital signals in real time.

It is also an object of the present invention to provide a confocal microscope with a system for real time processing of scan signals at high scanning rates. Additionally, an object is to provide a flexible system allowing a user to easily modify existing algorithms.

This object is accomplished by a confocal microscope comprising an illumination source, a scanning device with a scanning mirror system, a control and processing unit, which uses a plurality of programmable devices for processing the digital signals in real time, the control and processing unit having at least three input ports and one output port, a first detector generating analog signals corresponding to the light reflected from a specimen, a second detector generating analog signals corresponding to the intensity of the light from the illumination source, an electrical connection providing the control and processing unit with an analog position signal generated by the scanning device, and a first, a second and a third analog-to-digital converters for digitizing the analog signals received from the first and second detectors and the scanning device.

Yet another object of the present invention is to provide a method for real time processing of scan-signals from a confocal microscope, the method enabling the processing of the analog scan-signals at high scanning rates and loss free data collecting.

This object is achieved by a method comprising:
generating at least three different analog signals by a confocal microscope, wherein a first signal corresponds to the light reflected from a specimen, a second signal corresponds to an illumination reference and a third signal (a position signal) corresponds to a position of light on the specimen;
converting each analog signal into a respective digital signal by using a separate analog-to-digital converter for each analog signal;
directing the digital signals to a control and processing unit which uses at least one of programmable devices for processing the digital signals in real time;
buffering the digital position signals in a line buffer of the control and processing unit;

correcting the first digital signal for intensity fluctuations of the second digital signal to generate a corrected digital detection signal; and combining the corrected digital detection signal with a digital position signal to provide a combined signal.

An advantage of the inventive method and system is that the position signal of the focused scanning beam and of the signals from the detectors (the scanning beam and reference beam) are digitized at a very early stage. Processing of the data is done mainly in a digital form with the use of a programmable control and processing unit which is implemented in a programmable digital circuit, such as, for example, FPGA (Field Programmable Gate Array). Correction parameters can be used online, making the subsequent image processing much easier or unnecessary at all. The accuracy of the device depends solely on the accuracy of the detectors and of the analog-to-digital converters. Analog-to-digital converters with a large processing bandwidth are available at reasonable costs. The position correction function depends on the measurement condition variables and can be easily changed or modified online. The dynamic pixel accumulation allows the system to record several measurement values during the scan of an image pixel and to accumulate the data in a suitable buffer. The dynamic pixel accumulation during a measurement allows the system to operate in a wide dynamic range of scanning rates from a few Hz to up to 250 MHz.

Pixel accumulation calls for a simple analog circuit without giving up the high resolution and wide dynamic range. Despite the fact that analog-to-digital converters sample the intensity of signals only from a narrow band of signal heights, repeated scanning and pixel accumulation result in a theoretically unlimited bit resolution. The pixel accumulation technique also allows one to adjust the time necessary for data processing to the speed of a scan. For example, during a slow scan measurement the detected intensity signals are accumulated until the scanning beam reaches the next pixel element of the object. The pixel accumulation rate can then be adjusted to the data processing rate.

The advantages of the pixel accumulation method implemented in the present invention are similar to those of the line accumulation method, in which the intensity data obtained from multiple sequential scans of one scan line are stored in a suitable buffer arrangement. Differences between the line scans in different directions are averaged out by repeated line accumulation. In case of resonant galvanometers for the x-direction scans, only the line accumulation method is used, since pixel accumulation is not possible.

A further advantage of the system is its ability to compensate intensity fluctuations in real time, which repeats the predetermined process steps with the accuracy up to nanoseconds. The system of the present invention satisfies the requirements of flexibility and real time data processing, because, for example, there is no need to buffer data, since a computer controlled data recording is not used. The real time processing ability of the inventive system provides a loss free and flexible data collection with the highest possible scan rates. Computers are controlled by interrupts, so a running process has to be ended before further data processing can go on. The present invention has the ability of a high flexibility with respect to data processing changes and real time processing of the data.

BRIEF DESCRIPTION OF THE DRAWINGS

The subject matter of the present invention is described with reference to the embodiments shown in the following drawings.

DETAILED DESCRIPTION OF THE INVENTION

Figure 1:
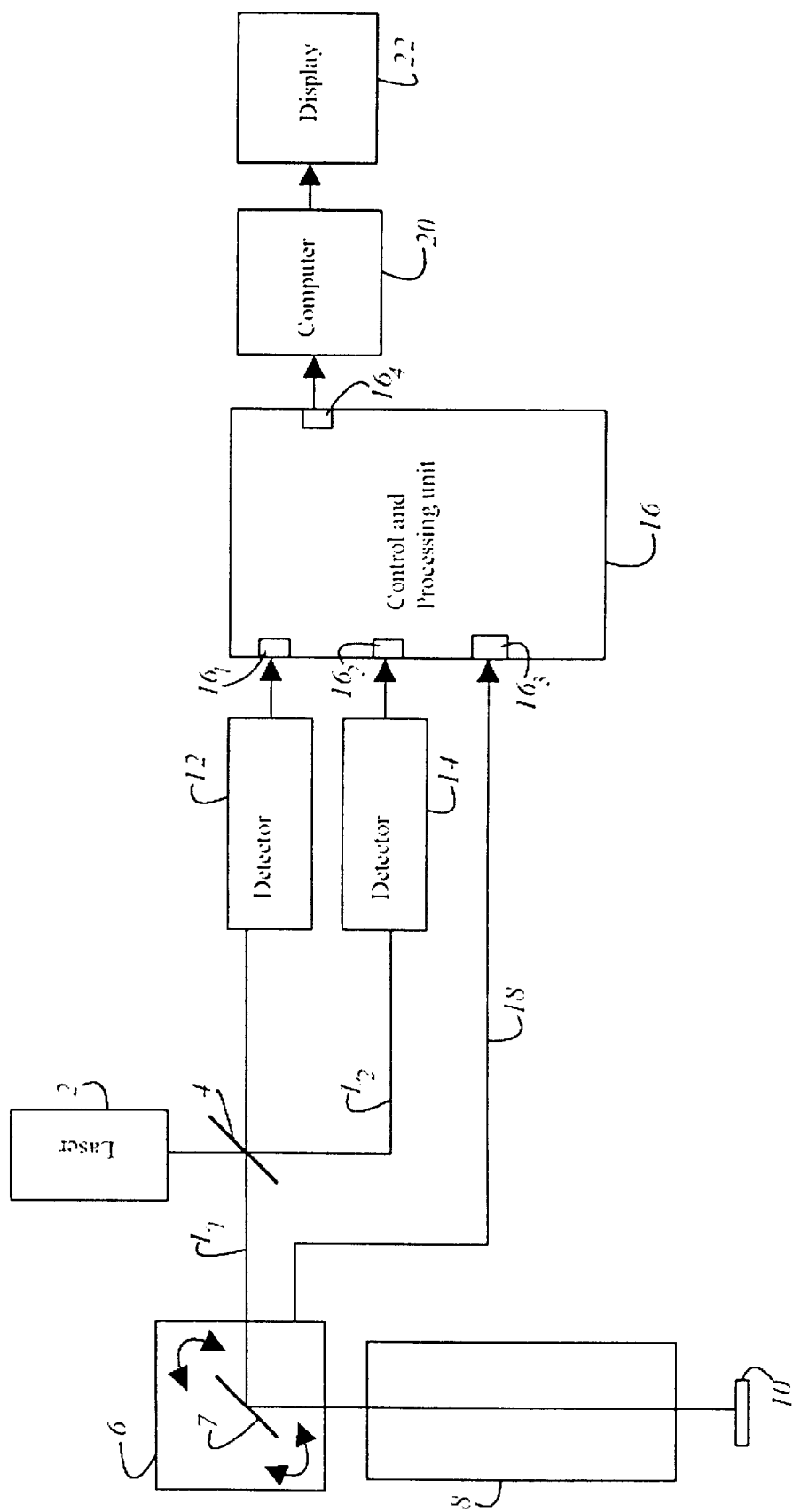
FIG. 1 is a schematic illustration of a confocal microscope and a system for obtaining three dimensional specimen images.

FIG. 1 shows a schematic illustration of a confocal microscope and a system for obtaining three dimensional specimen images. An illumination system 2 generates a light beam L. A beam splitter 4 divides the incident light beam L into a first path $L_1$ and into a second path $L_2$. The light from the illumination system is directed to a scanning device 6 along the first path $L_1$. Scanning device 6 comprises a scanning mirror system 7 moveable in such a way that the light propagating along the first path $L_1$ is scanned across a specimen 10. The light propagating along the first path $L_1$ passes through an optical system 8 before reaching specimen 10. The light reflected from the specimen travels along the first path $L_1$ back to beam splitter 4 and then to a first detector 12 positioned to receive the light reflected from specimen 10. First detector 12 converts that light into a first electrical signal I, wherein the first signal I is proportional to the intensity of the light reflected from the specimen. A second detector 14 receives the light traveling from illumination system 2 along the second path $L_2$. Similarly to the first detector 12, the second detector 14 converts the detected light into a second electrical signal R. The second signal R is proportional to the intensity of the detected light serving as an illumination reference. A control and processing unit 16 is provided with a first, a second and a third input ports $16_1$, $16_2$ and $16_3$. The first electrical signal I is fed to the first input port $16_1$, and the second electrical signal R is fed to the second input port $16_2$. The third input port $16_3$ receives a position signal P, generated in scanning device 6, via an electrical connection 18. The disclosed embodiment describes three different analog signals I, R and P fed to control and processing unit 16. It is contemplated by the present invention that more than three different signals can be fed to be processed in control and processing unit 16 through one or more multiplexers (not shown in FIG. 1) and processed in unit 16.

Control and processing unit 16 converts the incoming analog signals (the first electrical signal I, the second electrical signal R, and the position signal P), which signals may be distorted and disrupted, into corrected digital signals. Via an exit port 164 the digital signals are sent to a computer 20 which may carry out some image processing. A conventional display 22 is used to show the image of specimen 10 to a user of the system.

Figure 2:
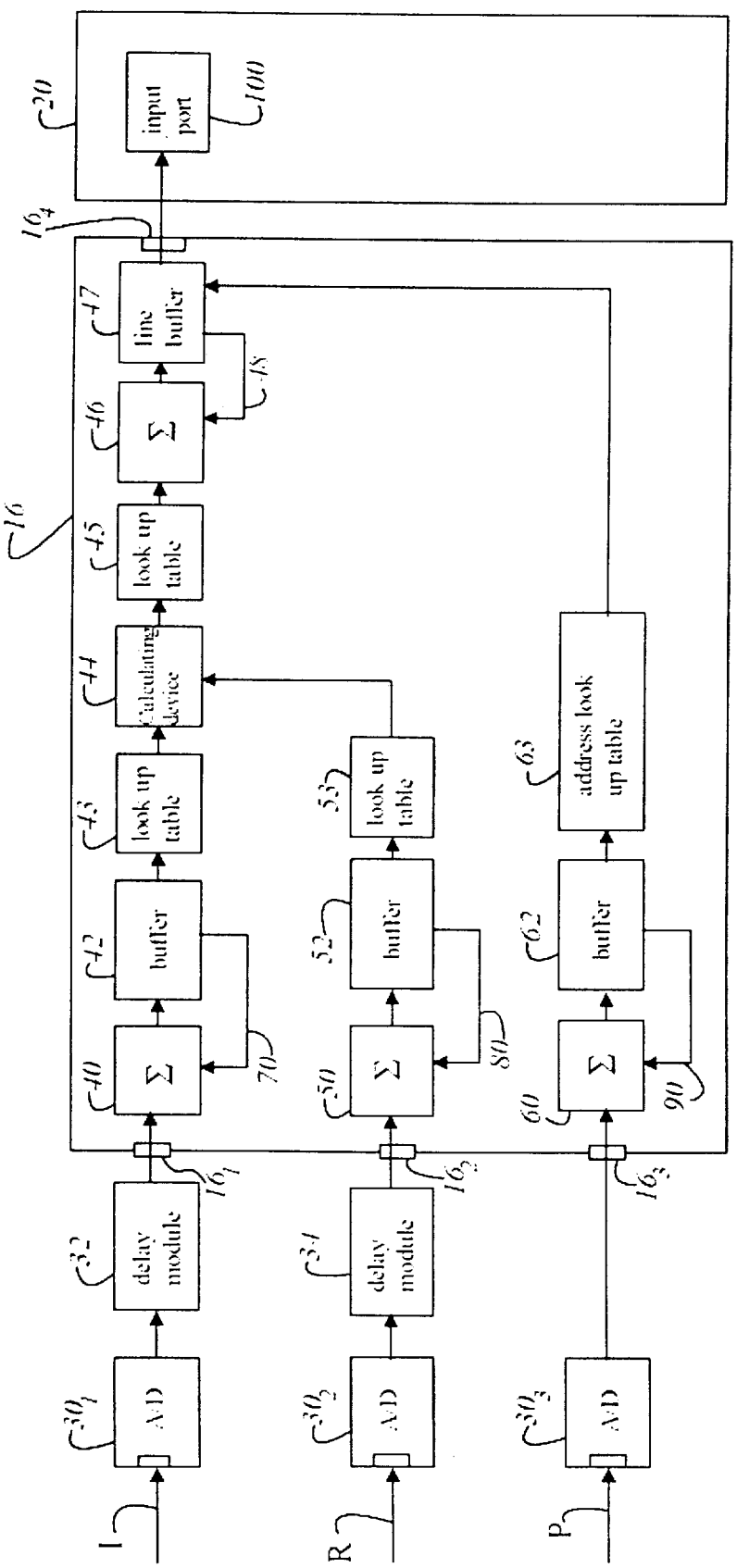
FIG. 2 is a schematic illustration of an embodiment of a processing unit.

An embodiment of control and processing unit 16 implemented with a plurality of FPGA-units (Field Programmable Gate Array) is shown in FIG. 2. The first analog electrical signal I is fed to a first analog-to-digital converter $30_1$, the second analog electrical signal R is fed to a second analog-to-digital converter $30_2$ and the analog position signal P is fed to a third analog-to-digital converter $30_3$. From the first analog-to-digital converter $30_1$ and from the second analog-digital converter $30_2$ the digitized signals are fed to a first and a second delay-modules 32 and 34 respectively which are used to carry out run-time differences. The first and second delay-modules 32 an 34 are important, since the first and second electric signals I and R have a processing time different from the processing time of the position signal P, meaning that the reaction time of scanning mirror system 7 is delayed due to inertia. The delay modules eliminate possible instrumental errors by factoring in their own processing time and reaction time delays. The outputs of the first and second delay modules 32 and 34 are fed to the first and second input ports 16, and 162 of control and processing unit 16. The digital signal from the first delay module 32 is sent to a first adder 40 followed by a first buffer 42. There is a loop 70 between the first buffer 42 and the first adder 40 to enable pixel accumulation. From the first buffer 42 the data are sent to a first look up table 43 which carries out log-conversion of the data. From the second delay module 34 the digital signal is sent to a second adder 50 followed by a second buffer 52. There is a loop 80 between the second buffer 52 and the second adder 50 to enable pixel accumulation. From the second buffer 52 the data are sent to a second look up table 53 which carries out log conversion of the data. From the third analog-to-digital converter 303 the positional data are sent to a third adder 60 followed by a third buffer 62. There is a loop 90 between the third buffer 62 and the third adder 60 to enable pixel accumulation. From the third buffer 62 the data are sent to an address look up table 63 which carries out correction of the position data with respect to a scan along the x-direction. To obtain correct digital data of the scan beam position, the present invention may use different look up tables, one table for each scan in the "+" or "−" x-directions.

From the first look-up-table 43 and the second look-up-table 53 the data are fed to a calculating device 44. Calculating device 44 subtracts the data corresponding to the first electrical signal I from the data corresponding to the second electrical signal R. The subtraction corrects short term intensity fluctuations of the output laser signal. The data from device 44 are fed to a fourth look up table 45, which converts the data by taking an exponent. The result of this conversion is the quotient of the data corresponding to the first electrical signal I and the data corresponding to the second electrical signal R. The data from the fourth look-up table 45 are fed to a fourth adder and then to a line buffer 47 correlating a specific digital position signal with a specific digital detection signal. A loop 48 between line buffer 47 and the fourth adder 46 enables line accumulation. The position data from address look up table 63 are also sent to line buffer 47. From line buffer 47 the corrected digital signals are sent to a data input port 100 of the computer 20 via exit port 164 of processing unit 16.

Figure 3:
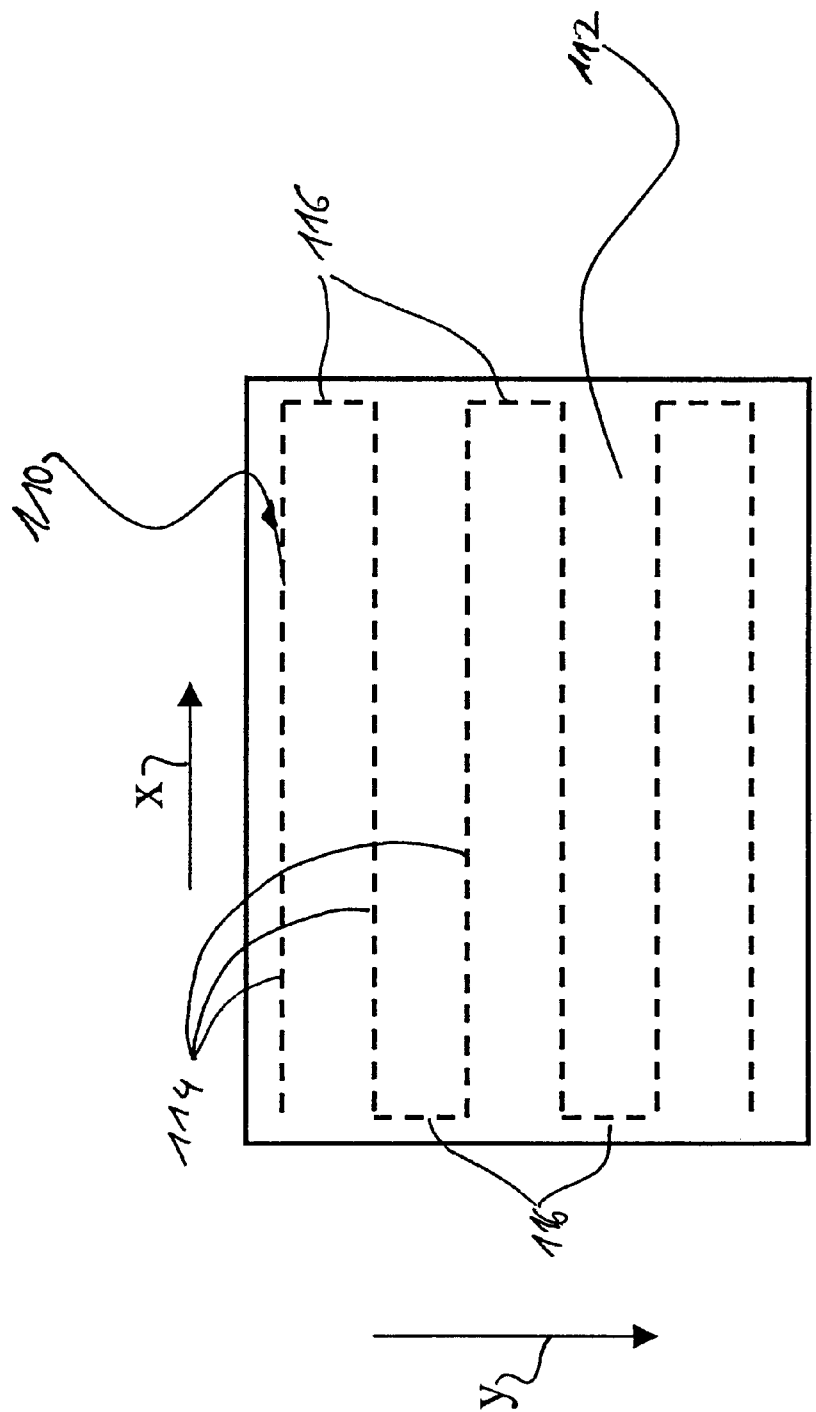
FIG. 3 is a schematic illustration of an ideal path of the focus of the scanning beam.

In most cases the devices tilting scanning mirror system 7 are galvanometers. In general, both resonant and non-resonant galvanometers can be used. The resonant galvanometers are very fast (about several kHz), but their precision is not as exact as that of the much slower non-resonant galvanometers. FIG. 3 shows an ideal path 110 of the focus of the scanning beam across a specimen area of interest 112. The dashed line represents ideal path 110 comprising a plurality of linear paths 114 scanned by the focused beam in a direction x of specimen area 112. Linear paths 114 in FIG. 3 are connected by constant line feeds 116 in a y-direction perpendicular to paths 114. In other words, ideal path 110 is a pattern of back and forth parallel lines in the x-direction connected by constant line feeds 116 in the y-direction. Line feeds 116 are accomplished by tilting a y-mirror (not shown), which results in moving the focus of the scanning beam to the next line. This next line is then scanned by tilting an x-mirror (not shown) followed by another line feed 116 and so on until the whole specimen area 112 is scanned.

Figure 4:
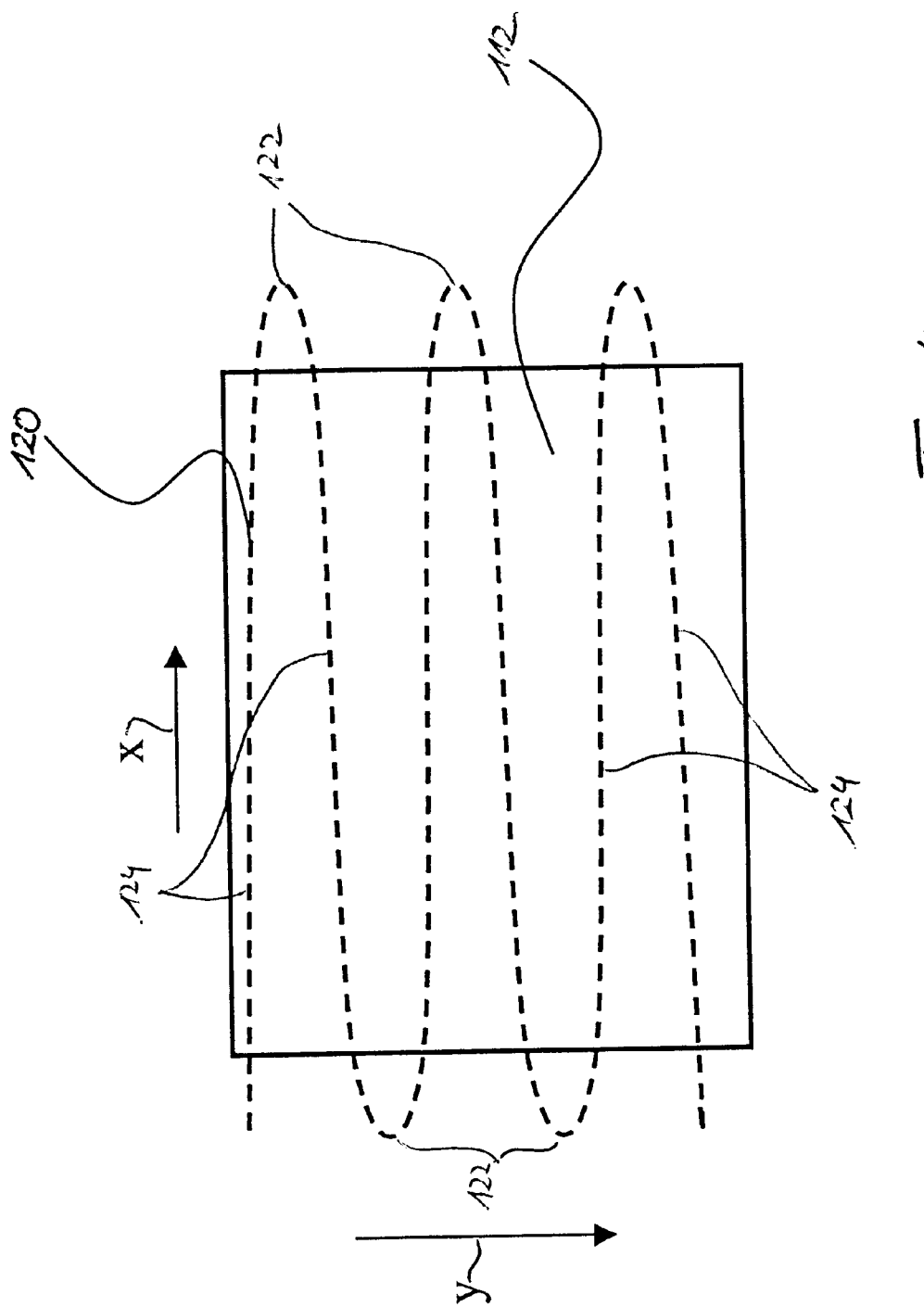
FIG. 4 is a schematic illustration of an actual path of the focus of the scanning beam.

However, ideal path 110 of FIG. 3 usually can not be followed in a confocal microscope because of the inertia of the mirrors and moving elements of a galvanometer. In a real measurement situation the scanning beam follows a sinusoidal real path 120 across specimen area 112, as illustrated in FIG. 4. Therefore, correction of the differences between ideal path 110 and actual path 120 becomes necessary especially near turning points 122, since the velocity of the scanning beam in the x-direction is higher at turning points 122, as compared to the velocity of the beam along linear regions 124 of the sinusoidal curve. In order to run a microscope at considerably high scanning rates, a real time processing unit (field programmable gate array FPGA) is used to correct and process the detector and position signals and provide for a correction of the path differences illustrated in FIG. 3 and FIG. 4. The FPGA also provides data corrections in the case of an asymmetric scan path (the scan path in the "+" x-direction being different from the scan path in the "−" x-direction). Such asymmetry calls for a different correction of the opposite scan paths. In other words, the position signal has to be corrected with respect to the different paths of the scanning beam across the object.

While the invention has been described in detail with particular reference to the illustrated embodiments thereof, it should be understood that variations and modifications can be practiced without departing from the spirit and scope of the present invention.

What is claimed is:

1. A system for processing scan signals from a confocal microscope having a scanning device, the system comprising:
    at least three different analog electrical signals generated by the confocal microscope, wherein a first analog electrical signal is proportional to the intensity of light reflected from a specimen, a second analog electrical signal is proportional to an illumination reference, and a third analog electrical signal is proportional to a positional signal generated by the scanning device;
    a first analog-to-digital converter receiving a first analog electrical signal and converting it into a first digital signal;
    a second analog-to-digital converter receiving a second analog electrical signal and converting it into a second digital signal;
    a third analog-to-digital converter receiving a third analog electrical signal and converting it into a third digital signal; and
    a control and processing unit using at least one programmable device for real time processing of the first, second and third digital signals received from the converters.

2. The system of claim 1, wherein at least one programmable device is a field programmable gate array.

3. The system of claim 1, wherein the control and processing unit comprises an address look up table to correct the position signal.

4. The system of claim 3, wherein the position signal generated by a scan in a "+" x-direction is different from the position signal generated by a scan in a "−" x-direction.

5. The system of claim 1, wherein a first look up table carries out a log conversion of a first digital signal.

6. The system of claim 1, wherein a second look up table carries out a log conversion of a second digital signal.

7. The system of claim 1, wherein the control and processing unit comprises a calculating device and a line buffer.

8. A confocal microscope with a system for processing scan-signals comprising:

an illumination source directing a light beam onto a specimen;

a control and processing unit having a plurality of programmable devices, at least three input ports and one output port;

a first detector receiving the light reflected from the specimen;

a second detector receiving the light from the illumination source;

a scanning device generating a position signal; and a first analog-to-digital converter receiving a signal generated by the first detector, a second analog-to-digital converter receiving a signal generated by the second detector, and a third analog-to-digital converter receiving the position signal generated by the scanning device, the first, the second and the third analog-to-digital converters outputting signals to the input ports of the control and processing unit.

9. The confocal microscope of claim 8, wherein the plurality of programmable devices are field programmable gate arrays.

10. The confocal microscope of claim 8, wherein the signal generated by the first detector is a first electrical signal corresponding to the intensity of the light reflected from the specimen, the signal generated by the second detector is a second electrical signal corresponding to an illumination reference, and the position signal is a third electrical signal corresponding to an actual position of the light beam on the specimen.

11. The confocal microscope of claim 10, wherein the control and processing unit comprises an address look up table to correct the position signal.

12. The confocal microscope of claim 11, wherein the scanning device comprises a scanning mirror system defining a positive scan path on a specimen surface in a "+" x-direction and a negative scan path in a "−" x-direction.

13. The confocal microscope of claim 12, wherein the positive scan path differs from the negative scan path with respect to time.

14. The confocal microscope of claim 10, wherein a first look up table carries out a log conversion of the first electrical signal.

15. The confocal microscope of claim 10, wherein a second look up table carries out a log conversion of the second electrical signal.

16. The confocal microscope of claim 8, wherein the control and processing unit comprises a calculation device and a line buffer.

17. The confocal microscope of claim 10 further comprising a computer for receiving a correlated specific digital position signal and a specific digital detection signal, the computer having a display for providing an image of the specimen.

18. A method for processing scan signals from a confocal miscoscope, the method comprising:

generating at least three analog signals a, first signal corresponding to the light reflected from a specimen, a second signal corresponding to an illumination reference of the confocal microscope, and a position signal;

digitizing the first signal, the second signal and the position signal to provide digital signals comprising a first digital signal, a second digital signal and a digital; position signal, respectively;

providing a control and processing unit receiving the digital signals, the control and processing unit having a plurality of programmable devices for real time processing of digital signals;

buffering the digital position signal in a line buffer of the control and processing unit;

correcting the first digital signal for intensity fluctuations by subtracting the second digital signal from the first digital signal and thereby generating a corrected digital detection signal; and combining the corrected digital detection signal with the digital position signal to provide a combined signal.

19. The method of claim 18, wherein providing the control and processing unit having the plurality of programmable devices comprises providing the programmable devices that are field programmable gate arrays.

20. The method of claim 18 further comprising providing correction for the digital position signal by using an address look up table in the control and processing unit.

21. The method of claim 20, wherein providing correction of the digital position signal is accomplished by correcting a scan in a "+" x-direction and correcting a scan in a "−" x-direction.

22. The method of claim 18, wherein a first look up table carries out a log conversion of the first digital signal.

23. The method of claim 18, wherein a second look up table carries out a log conversion of the second digital signal.

24. The method of claim 18 further comprising feeding the combined signal to a computer and displaying an image of the specimen.

* * * * *